(12) United States Patent
Binding et al.

(10) Patent No.: US 8,738,779 B2
(45) Date of Patent: May 27, 2014

(54) METHOD AND APPARATUS FOR A CONTEXT-BASED SERVICE LOOK UP

(75) Inventors: Carl Binding, Rueschlikon (CH); Francois Bernard Dolivo, Waedenswil (CH); Reto Josef Hermann, Buttikon (CH); Christian Hoertnagl, Kilchberg (CH); Andreas Schade, Langnau am Albis (CH)

(73) Assignee: International Business Machines Corporation, Armonk, NY (US)

( * ) Notice: Subject to any disclaimer, the term of this patent is extended or adjusted under 35 U.S.C. 154(b) by 864 days.

(21) Appl. No.: 12/134,816

(22) Filed: Jun. 6, 2008

(65) Prior Publication Data

US 2008/0243535 A1 Oct. 2, 2008

Related U.S. Application Data

(63) Continuation of application No. 11/116,717, filed on Apr. 28, 2005.

(51) Int. Cl.
*G06F 15/16* (2006.01)

(52) U.S. Cl.
USPC ........ 709/227; 709/203; 709/217; 705/14.49; 705/14.35

(58) Field of Classification Search
None
See application file for complete search history.

(56) References Cited

U.S. PATENT DOCUMENTS

| | | | |
|---|---|---|---|
| 6,453,347 B1 * | 9/2002 | Revashetti et al. | 709/224 |
| 6,611,842 B1 * | 8/2003 | Brown | 1/1 |
| 6,717,946 B1 * | 4/2004 | Hariguchi et al. | 370/392 |
| 6,718,551 B1 * | 4/2004 | Swix et al. | 725/32 |
| 6,804,659 B1 * | 10/2004 | Graham et al. | 705/14.49 |
| 6,957,393 B2 * | 10/2005 | Fano et al. | 715/747 |
| 7,039,018 B2 * | 5/2006 | Singh et al. | 370/255 |
| 7,493,622 B2 * | 2/2009 | Borkan | 719/310 |
| 8,135,801 B2 * | 3/2012 | Harper et al. | 709/217 |
| 8,180,364 B2 * | 5/2012 | Fano et al. | 455/456.1 |
| 8,428,618 B2 * | 4/2013 | Fano et al. | 455/456.1 |
| 8,489,111 B2 * | 7/2013 | Chawla | 455/456.1 |
| 2002/0073165 A1 * | 6/2002 | McNulty et al. | 709/217 |
| 2002/0082931 A1 * | 6/2002 | Siegel et al. | 705/26 |
| 2002/0133545 A1 * | 9/2002 | Fano et al. | 709/203 |
| 2002/0143783 A1 * | 10/2002 | Bakalash et al. | 707/100 |
| 2002/0194183 A1 * | 12/2002 | Yoakum et al. | 707/10 |
| 2003/0123423 A1 * | 7/2003 | Okanoue | 370/338 |
| 2003/0191689 A1 * | 10/2003 | Bosarge et al. | 705/14 |
| 2004/0133848 A1 * | 7/2004 | Hunt et al. | 715/500 |

(Continued)

OTHER PUBLICATIONS

Realms and States: A Framework for Location Aware Mobile Computing Author: Ajith K. Narayanan (IBM Emerging Technology Centre).*

(Continued)

*Primary Examiner* — Gurkanwaljit Singh
(74) *Attorney, Agent, or Firm* — Daniel P. Morris; McGinn IP Law Group, PLLC

(57) ABSTRACT

The present invention relates to a context-based service look up, wherein a service instance, having a scope includes at least one service instance data set having a hierarchy of levels. A service consumer data set, having a hierarchy of levels is received from a service consumer, having a situation. Comparisons are made of each service consumer data set with each service instance data set, for the same level. Dependent on results of the comparisons, it is determined whether said situation of said service consumer matches said scope of said service instance.

21 Claims, 3 Drawing Sheets

| $V_{ki}$ | $W_{ki}$ | COMP_V |
|---|---|---|
| $V_{ki}$ | $W_{ki}$ | If $V_{ki} == W_{ki}$ MATCH<br><br>else FAIL ($V_{ki} \neq W_{ki}$) |
| * | * | MATCH |
| $V_{ki}$ | * | MATCH |
| * | $W_{ki}$ | MATCH |

(56) References Cited

U.S. PATENT DOCUMENTS

| | | | |
|---|---|---|---|
| 2004/0158858 A1* | 8/2004 | Paxton et al. | 725/42 |
| 2004/0176958 A1* | 9/2004 | Salmenkaita et al. | 704/275 |
| 2004/0186777 A1* | 9/2004 | Margiloff et al. | 705/14 |
| 2004/0194141 A1* | 9/2004 | Sanders | 725/53 |
| 2005/0080775 A1* | 4/2005 | Colledge et al. | 707/3 |
| 2005/0262428 A1* | 11/2005 | Little et al. | 715/501.1 |
| 2006/0111111 A1* | 5/2006 | Ovadia | 455/439 |
| 2006/0230457 A1* | 10/2006 | Hagan et al. | 726/26 |

OTHER PUBLICATIONS

Automated dental identification: A micro-macro decision-making approach by Nassar, Diaa Eldin M., Ph.D., West Virginia University, 2005, 140 pages; AAT 3275990.*

Mostefaoui, Context Aware Service Provisioning, 0-7803-8577-2/04, 2004 IEEE.*

Narayanan, Realms and States: A Framework for location aware mobile Computing, Copyright ACM 2001, 1-58113-376-6/01/07.*

Lemlouma, Tayeb, and Nabil Layaïda. "Context-aware adaptation for mobile devices." Mobile Data Management, 2004. Proceedings. 2004 IEEE International Conference on. IEEE, 2004.*

Virrantaus, Kirsi, et al. "Developing GIS-supported location-based services."Web Information Systems Engineering, 2001. Proceedings of the Second International Conference on. vol. 2. IEEE, 2001.*

Harter, Andy, et al. "The anatomy of a context-aware application." Wireless Networks 8.2/3 (2002): 187-197.*

Lum, Wai Yip, and Francis CM Lau. "A context-aware decision engine for content adaptation." Pervasive Computing, IEEE 1.3 (2002): 41-49.*

Varshney, Upkar. "Location management for mobile commerce applications in wireless internet environment." ACM Transactions on Internet Technology (TOIT) 3.3 (2003): 236-255.*

Lemlouma, Tayeb, and Nabil Layaïda. "Adapted content delivery for different contexts." Applications and the Internet, 2003. Proceedings. 2003 Symposium on. IEEE, 2003.*

Lemlouma, Tayeb, and Nabil Layaïda. "Universal profiling for content negotiation and adaptation in heterogeneous environments." W3C Workshop on Delivery Context, W3C INRIA Sophia-Antipolis, France. 2002.*

Zhang, Dongsong. "Web content adaptation for mobile handheld devices."Communications of the ACM 50.2 (2007): 75-79.*

Yoneki, Eiko, and Jean Bacon. "An adaptive approach to content-based subscription in mobile ad hoc networks." Pervasive Computing and Communications Workshops, 2004. Proceedings of the Second IEEE Annual Conference on. IEEE, 2004.*

Samet, Hanan. "The quadtree and related hierarchical data structures." ACM Computing Surveys (CSUR) 16.2 (1984): 187-260.*

Narayanan, Ajith K., "Realms and States: A Framework for Location Aware Mobile Computing,"First ACM Workshop on Mobile Commerce held in Conjunction with the Seventh Annual International Conference on Mobile Computing and Networking (MOBICOM), Jul. 2001, Rome, Italy.

* cited by examiner

FIG. 1

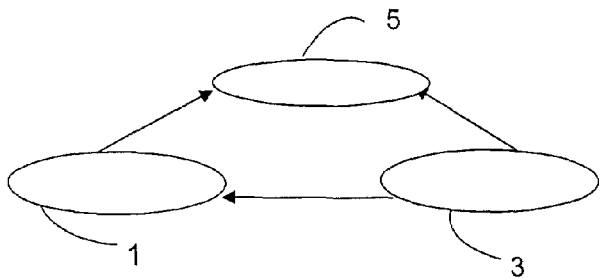

FIG. 2

| | |
|---|---|
| 2 | Input<br>$\Sigma=\{a_1,\ldots a_x\}; \quad a_k=[V_{k1}, V_{k2}, \ldots, V_{kn}]$<br>$\Omega=\{b_1,\ldots b_y\}; \quad b_k=[W_{k1}, W_{k2}, \ldots W_{kn}]$ |
| 4 | PME |
| 6 | Output |
| 8 | AGG_V (MATCH, PARTIAL, FAIL) |
| 10 | AGG_V=MATCH |
| 12 | For i=1 to x { |
| 14 |     For j=1 to y {<br>        ACC_V=MATCH; |
| 16 |         For k=1 to min(n,m){<br>            COMP_V=COMP_FCT($V_{ik}$, $W_{jk}$); |
| 18 |             ACC_V=ACC_FCT(COMP_V,ACC_V);<br>        }<br>        If (ACC_V==MATCH &&n<m) |
| 20 |             ACC_V=PARTIAL  ; |
| 22 |         IF ((ACC_V==MATCH) \|\| ((PME=TRUE)&& (ACC_V=<br>            PARTIAL )) |
| 24 |             Break;<br>    } |
| 26 |     AGG_V=AGG_FCT(ACC_V,AGG_V)<br>} |

FIG. 3

| $V_{ki}$ | $W_{ki}$ | COMP_V |
|---|---|---|
| $V_{ki}$ | $W_{ki}$ | If $V_{ki} == W_{ki}$ MATCH else FAIL ($V_{ki} \neq W_{ki}$) |
| * | * | MATCH |
| $V_{ki}$ | * | MATCH |
| * | $W_{ki}$ | MATCH |

FIG. 4

| | | COMP_V | | |
|---|---|---|---|---|
| | | MATCH | PARTIAL | FAIL |
| ACC_V | MATCH | MATCH | PARTIAL | FAIL |
| | PARTIAL | PARTIAL | PARTIAL | FAIL |
| | FAIL | FAIL | FAIL | FAIL |

FIG. 5

|  |  | ACC_V | | |
|---|---|---|---|---|
|  |  | MATCH | PARTIAL | FAIL |
| AGG_V | MATCH | MATCH | PARTIAL | PARTIAL |
|  | PARTIAL | PARTIAL | PARTIAL | PARTIAL |
|  | FAIL | PARTIAL | PARTIAL | FAIL |

METHOD AND APPARATUS FOR A CONTEXT-BASED SERVICE LOOK UP

RELATED APPLICATIONS

This Application is a Continuation Application of U.S. patent application Ser. No. 11/116,717, filed on Apr. 28, 2005, which is incorporated herein by reference.

TECHNICAL FIELD

The present invention relates to a method for a context-based service look up. It further relates to an apparatus for a context-based service look up.

BACKGROUND OF THE INVENTION

More and more mobile computing devices become commonplace in every day life. Such mobile computing devices include cell phones, personal digital assistance (PDA) and notebooks all of which have achieved a high penetration rate in modern society. With such mobile computing devices it has become of interest to discover computing services, for example, in the geographical vicinity of the current location of the mobile computing device. In this respect context-based services may be, for example, location-based services or, for example, time-based services. Location-based services include printing services, weather forecast applications, travel guidance, assistance and emergency services for example.

Context-based service look up takes place in a system comprising a service consumer being represented by, for example, a mobile computing device, further comprising a service provider and a registry server. The service consumer looks up services in the registry server and consumes service functionality by invoking operations on a service instance. The service provider publishes service instances on the registry server for look up.

A service is an abstract entity encapsulating functional behaviour accessible via a well-defined service interface. A service has a service type, which defines a set of named operations, the generic semantics, and the abstract input and output messages.

A service instance is a concrete entity implementing a service. Associated with a service instance is a set of attributes describing additional aspects of the service. Binding information is a set of mandatory attributes and describes the service instances, for example an access point in terms of network address, protocol and messages format. Additional attributes may be service qualifiers, which further differentiate service instances.

The service consumer looking up a service is situated in some context. This context may be expressed by a set of attributes, which may be referred to as context qualifiers. The set of all context qualifiers applicable to the service consumer is its situation. The set of all context qualifiers applicable to a particular service instance is the service instance's scope.

Context-based service look up is the process of matching a service consumer's situation with the published service instances' scopes. A match occurs, if the service consumer situation is within a service instance's scope.

Under "http://www.cs.usy.ac.cy/courses/EPL603/gini-3.ppt" a presentation is made available to the public concerning the matching of object-oriented data structures, in particular Java objects. It discloses an example printer attribute location (floor, "3", "1234", building "A1").

It is a challenge to provide a method for a context-based service look up, which enables an efficient context-based service look up. It is further a challenge to provide a device for a context-based service look up which enables an efficient context-based service look up.

SUMMARY OF THE INVENTION

According to one aspect of the invention there is a method for a context-based service lookup, wherein a service instance, having a scope ($\Omega$), comprises at least one service instance data set (b) having a hierarchical state structure, with each state of each hierarchy level being contained in the respective higher-level state of the hierarchy, wherein the method comprises a reception step for receiving from a service consumer (1), having a situation ($\Sigma$), at least one service consumer data set (a) having said hierarchical state structure, and wherein said service instance data set (b) contains an amount (m) of state levels independent from an amount (n) of levels contained in said service consumer data set (a), a comparison step for comparing each service consumer data set (a) with each service instance data set (b) by performing comparisons of the respective state values (v, w) of states of the same level of hierarchy, an aggregation step for aggregating the results of the comparisons, a determining step for determining, depending on the aggregate results, whether said situation ($\Sigma$) of said service consumer (1) matches said scope ($\Omega$) of said service instance. The hierarchical state structure of the service instance data set and of the service consumer data set makes possible in an easy way an intuitive characterisation of the scope and of the situation, respectively. In addition, it enables a very effective matching of the service consumer's situation with the service instance's scope.

The method is simple to implement without consuming a lot of computational power and requiring complex computational operations, as the main computational task conducted is the comparing operation between the respective state values of states of the same hierarchy of the respective service consumer data set and the respective service instance data set.

In a preferred embodiment of the method, the comparison step comprises comparing the respective state values of states of the same hierarchy level starting with the highest level and then going down the hierarchy until a lowest-level hierarchy state in the service consumer data set or the service instance data set has been compared. This reduces the computational effort, if the amount of state hierarchies contained in the service consumer data set differs from that of the service instance data set.

In a further preferred embodiment the method comprises an assignment step of assigning a match value to a compare variable, if the state values of the respective states of the same level in the hierarchy of the service consumer data set and the service instant data set match each other, if both have a wildcard value, or, if only the state value of the respective state of the service instance data set has the wildcard value. The wildcard value is a value that stands for all possible state values of the respective state. This has the advantage of a shortened context representation and a simple conduction of the comparison.

In a further preferred embodiment of the method an accumulation step comprises accumulating the results of the comparisons by first initializing an accumulation variable with the match value, second keeping the match value for the accumulation variable only as long as the compare-variable has the match value while going down the state hierarchy. This enables a very efficient accumulation.

In a further preferred embodiment of the method the aggregation step further comprises first initialising an aggregation variable with the match value, and second keeping the match value of the aggregation variable only as long as the accumulation variable has the matched value after the full comparison of the respective service consumer data set with the respective service instance data set. This enables a very efficient aggregation of results across multiple datasets of the full comparisons.

In a further preferred embodiment of the method, the aggregation step further comprises assigning a partial match value to the compare variable, if only the state value of respective states of the service consumer data set has the wildcard value. This enables an even more refined matching of the scope and the situation.

According to a further preferred embodiment of the method, the aggregation step further comprises assigning the partial match value to the accumulation variable, if, while going down the state hierarchy, the compare variable has the match value of the partial match value and the accumulation variable has the match value or the partial match value. This also very efficiently allows a more refined matching.

In a further preferred embodiment of the method, the aggregation step further comprises assigning the partial match value to the aggregation variable, if, while aggregating the results of the full comparisons of each respective service consumer data set with each respective service instance data set, the aggregation variable has the match value, the accumulation value has the partial match value or a fail value or the aggregation variable has the partial match value or the aggregation variable has the fail value and the accumulation variable has the match value or the partial match value. Otherwise the aggregation variable is assigned the fail value. This also enables a very efficient refined matching.

In a further preferred embodiment of the method the states are locations. This enables a location based service look up with location as the context in a very efficient way. In a further preferred embodiment of the method the states are time intervals.

According to a second aspect of the invention, an apparatus for a context-based service look up is provided, which corresponds to the method for the context-based service look up and its preferred embodiments. The respective advantages also correspond.

According to a third aspect of the present invention, a computer program element comprising a computer program code, is provided. The computer program element, when loaded in a processor of a data processing system, configures the processor to perform the method for the context-based service look up.

According to a fourth aspect of the present invention, a storage medium encoded with machine-readable program code for a context-based service look up is provided, wherein said program code includes instructions for causing a server to implement the method for the context-based service look up.

According to a fifth aspect of the present invention, there is provided a method of equipping a client system with a context-based service look up, wherein the client system is provided with a capability to compare each service consumer data set (a) of a service consumer with each service instance data set (b) of a service instance by comparing respective state values (v, w) of states of the same level of hierarchy of said service consumer data set (a) or said service instance data set (b), starting with the highest level in the hierarchy and then going down the hierarchy, aggregate the results of the comparisons of each respective service consumer data set (a) with each respective service instance data set (b) and determine, depending on the aggregate results, whether a situation ($\Sigma$) of said service consumer (1) matches a scope ($\Omega$) of said service instance.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

FIG. 1, a system for context-based service look up,

FIG. 2, a flowchart of a program that is stored on a registry server and is run on the registry server, FIG. 3, an input/output table for a compare function, FIG. 4, an input/output table for an accumulation function and FIG. 5, an input/output table for an aggregation function.

DETAILED DESCRIPTION OF THE DRAWINGS

FIG. 1 shows a system for conducting a context-based look up. The system comprises a service consumer which may, for example, be a cell phone, a PDA or a notebook. The system further comprises a service provider, which offers various services referred to as service instances, such as a printing service, weather forecast applications, travel guidance or assistance or emergency services. The service provider 3 is designed for publishing its service instances on the registry server 5 for look up. The context of the service look up is location information in this case for illustrative purposes.

The service consumer may have the need to print out a given document, stored on the service consumer 1, on a printer. The person carrying the service consumer 1 may be interested in printing the document on a nearby printer. The matching of the right printer takes place in the registry server 5 by running the program according to FIG. 2.

The service consumer 1 may be designed for communicating with the registry server 5, for example, via a cell phone connection or a wireless LAN.

Service instances are published on the registry server 5 by the service provider 3. Service instances have a scope $\Omega$. The scope $\Omega$ is characterized by at least one service instance data set b having a hierarchical state structure, with each state of each hierarchy-level being fully contained in the respective higher-level state of hierarchy. The service instance is therefore characterized by a set of service instance data sets $b_1$ to $b_y$ (see FIG. 2). Each of these service instance data sets $b_k$ comprises the hierarchical states with given respective state values w which have been marked with indices k1 to km, whereas k is a counter for the respective service instance data set b and m is the amount of state hierarchies of the respective service instance data set b. The exact value of the amount m of state hierarchies of the service instance data set b may vary from each individual service instance data set b to another. The state structure is hierarchical, from which follows that each state of a lower level in the hierarchy is fully contained in the respective state of the higher level in the hierarchy.

The service instance data set may, by way of example, comprise hierarchical symbolic realms classifying, for example, locations on a company campus. Each service instance data set may in that way comprise the states "campus", "building", "floor", and "room". A specific service instance data set b may, for example, have the state values w of /ZRL/C/3/27 denoting the Zurich laboratory campus of IBM, building C in the campus, third floor of building C, and room No. 27. The state values of another service instance data set b may, for example, be /ZRL/*/*/12 denoting the set of rooms with the number "12" on all floors in all buildings of the Zurich laboratory campus of IBM. Another example for a possible service instance data set b would be in this case /ZRL/C/*/* denoting the entire C building on the Zurich laboratory campus of IBM. Another service instance data set b may, by way of example, have the state values /ZRL/C denoting the entire C building on the IBM Zurich laboratory campus. In this case, the amount m of state hierarchies would only be 2 instead of 4 regarding the previous examples. The scope Ω of the respective service instance may, for example, be characterized by six service instance data sets b having state values being representative for adjacent rooms on the same floor of the same building on the same campus.

The service consumer 1 has its situation, which is characterized by at least one service consumer data set a having the hierarchical state structure. The service instance data set b contains an amount n of state hierarchies independent from the amount m of state hierarchies contained in said service consumer data set a. Therefore, the service consumer 1 is characterized by its situation Σ (FIG. 2), which comprises the service consumer data sets $a_1$ to $a_x$. The respective service consumer data sets $a_k$ have allocated state values v, where k denotes the respective service consumer data set and 1 to n the respective state values in the hierarchy, where n is the amount of state hierarchies. The examples given for the service instance data sets b may in part also be valid for the respective service consumer data sets a. The situation Σ of the service consumer may, for example, be characterized by four different room numbers on a given floor of a given building on a given campus and may result from a cell phone receiver being responsible for communicating with all cell phones in these respective rooms or also a wireless LAN station coordinating all wireless LAN connections in these rooms.

The scope Ω with its service instance data sets and also the situation with its service consumer data sets a may, by way of the symbolical hierarchical state structure, be in a simple way allocated with the respective state values w, v as in the case by way of example described above. The respective campus, building, floor, and room may in a simple way be assigned with the respective state values v, w. For that purpose, the service consumer 1 may have a respective man/machine interface for inputting these things. However, it may also comprise, for example, a GPS positioning system for determining the exact geographic location and have then means for translating these geographic coordinates in the respective state values v of the respective service consumer data sets a.

A computer program for matching the service instance with the service consumer in respect of the context based service lookup, is described by the symbolic program code of FIG. 2 and in the following.

The computer program has as input the respective situation Σ of the service consumer 1 and the scope Ω of the respective service instance. In addition to that, it may have as input a partial match enabled flag PME, which when set to TRUE accelerates the computation of the matching result if also a partial match PARTIAL is one of the desired outputs of the program.

The output of the program is an aggregation variable AGG_V, which may have a match value MATCH or the partial match value PARTIAL or a fail value FAIL. In case the aggregation variable AGG_V has as output of the program the match value MATCH, then the situation of the service consumer matches the scope of the service instance. If the output of the program is the fail value FAIL of the aggregation variable AGG_V, then the situation Σ of the service consumer 1 does not match the scope Ω of the service instance. If the output of the program is the partial value PARTIAL of the aggregation variable AGG_V, then the situation Σ of the service consumer 1 matches partially the scope Ω of the service instance. It should be noted that the input parameter PME does not constrain the output of the program to the values MATCH or FAIL. The matching result PARTIAL may be interpreted optimistically as a possible match, or pessimistically as a possible fail.

The program is started then in a line 10, where the aggregation variable AGG_V is initialized with the match value MATCH. In line 12, a first "FOR" loop is started with a counter i being the first time of going through the FOR loop initialized to a value 1 and with the FOR condition being true up to the counter having a value x being the amount of service consumer data sets a characterizing the situation Σ of the service consumer 1. After that, a second FOR loop is included in the first FOR loop comprising a counter j, being initialized with 1 on the first time the four loop is started, that is for every consecutive run through the first FOR loop j is again initialized with 1. The second FOR loop is then run for y times, y being assigned the value of the amount of service instance data sets b characterizing the scope Ω. Within this second FOR loop in line 14, an accumulation variable ACC_V is first initialized with the match value MATCH. Then in line 15, a third FOR loop is started with a counter k being assigned the value 1 and is run until after the counter k has reached a value being characterized by a minimum of the amount n of levels in the state hierarchies of the respective service consumer data set a and the amount m of levels in the state hierarchies of the respective service instance data set b.

Within this third FOR loop first in line 16, a compare variable COMP_V is allocated an output of a compare function COMP_FCT with the inputs of the respective state values $v_{ik}$, $w_{jk}$. The input/output characteristic of the compare function COMP_FCT is shown in the table of FIG. 3. The symbolic star symbolizes a wildcard * meaning, that all state values within the respective state are valid values. A partial match value PARTIAL is assigned to the compare variable COMP_V, if the respective state value $w_{jk}$ of the respective service instance data set $b_j$ has a specific value. This is the case as, for example, the wildcard value * may stand for all possible rooms whereas the state value $w_{jk}$ may stand, for example, for room No. 25. In this case, room No. 25 is, of course, one of the rooms covered by the wildcard value * but it may not be the exact location of the service consumer.

In line 17, then the accumulation variable ACC_V is assigned the output of the accumulation function, which has as inputs the compare variable COMP_V and the accumulation variable ACC_V. FIG. 4 shows the resulting outputs of the accumulation function ACC_V depending on the values of the compare variable COMP_V and the accumulation variable ACC_V.

After the third FOR loop, it is checked in line 19 whether the accumulation variable ACC_V has the match value MATCH and the amount n of state hierarchies of the respective service consumer data set a is smaller than the amount m of state hierarchies of the respective service instance data set b. If this is the case, then in line 20 the accumulation variable ACC_V is assigned the partial match value PARTIAL as the respective service instance data set b has a lower resolution (less levels) in its state hierarchy than the respective service consumer data set a and therefore, for example, it is just possible to determine that both match, for example, the Zurich laboratory campus of IBM and the building C. However, the respective service instance may only be available on a specific floor. However, the respective service consumer data set a does not specify the floor.

Then, in line 21, it is checked whether the accumulation variable ACC_V has the match value MATCH or the partial match enable flag PME has the true value TRUE and the accumulation variable ACC_V has the partial match value PARTIAL. In this case, a break is conducted meaning that the second FOR loop is terminated.

After terminating the second FOR loop, the aggregation variable AGG_V is assigned the output of an aggregation function AGG_FCT in line 25. The aggregation function AGG_FCT has as input the accumulation variable ACC_V and the aggregation variable AGG_V. Its output table dependent on the values of its inputs, the accumulation variable ACC_V and the aggregation variable AGG_V are shown in the table of FIG. 5.

When the first FOR loop is then terminated, the then up-to-date value of the aggregation value variable AGG_V is output by the program and is then the result of the whole matching procedure.

The program has the advantage that it is fairly simple and enables a well-structured comparison. In contrast to this, when a purely geographic approach would be taken in which both the current location of the service consumer 1 and the service instance would be given in a global coordinate system such as WGS84, shapes would need to be defined, which may be approximated by a polygon defined by a set of points given as coordinates in the global coordinate system. This geographic approach would probably require a location sensing mechanism that reports its reading with respect to the selected global coordinate system. This is natural for a system such as GPS but requires additional mapping steps if location sensing is based on cell IDs or base station IDs, as available in cellular telephony or local area network systems. The mapping steps would then map the cell or base station ID to the geographic location. Likewise, all service instances would likely be attributed with their service area in the global coordinate system. This probably requires either the capturing of geographic areas in the global coordinate system or the transformation of area maps or floor plans from some local coordinate system to the global geographic coordinate system. The data capture and processing and the data volume would pose severe data management problems. Furthermore, determining inclusion of an arbitrary polygon within another arbitrary polygon usually requires computational geometry, which is costly.

The present invention can be realized in hardware, software, or a combination of hardware and software. Any kind of computer system—or other apparatus adapted for carrying out the method described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system—is able to carry out these methods.

Computer program element or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. A method for a context-based service lookup, the method comprising:

receiving from a service instance having a scope, at least one service instance data set having a hierarchical state structure on a processor, with each state of each hierarchy level contained in a respective higher-level state of a hierarchy;

receiving from a service consumer having a situation, at least one service consumer data set having said hierarchical state structure on the processor, wherein said service instance data set comprises an amount of state levels independent from an amount of levels contained in said service consumer data set;

comparing each service consumer data set with each service instance data set by performing comparisons of respective state values of states of a same level of hierarchy within the processor;

aggregating the results of the comparisons within the processor;

determining, depending on the aggregate results, if said situation of said service consumer matches said scope of said service instance within the processor;

after said determining if said situation of said service consumer matches said scope of said service instance, outputting an aggregate variable that comprises a fail value, wherein said at least one service consumer data set comprises a plurality of allocated state values; and assigning a match value to a compare variable, if said respective state values of states of the same level in the hierarchy of said service consumer data set and a state value of said service instance data set have a wild card value, said wild card value comprising a value that stands for all possible values of said respective state values of states.

2. The method according to claim 1, wherein said comparing comprises comparing the respective state values of states of the same level of hierarchy starting with the highest level in the hierarchy and then going down the hierarchy until the lowest level state in the hierarchy of either of said service consumer data set or said service instance data set has been compared.

3. The method according to claim 1, wherein, if said respective states values of states of the same level in the hierarchy of said service consumer data set and said service instance data set match each other, the match value is assigned to the compare variable.

4. The method according to claim 3, further comprising accumulating said results of the comparisons by first initializing an accumulation variable with said match value, and then keeping said match value for the accumulation variable only as long as while going down the state hierarchy, wherein said compare variable has said match value.

5. The method according to claim 4, wherein said aggregating further comprises first initializing an aggregation variable with said match value, and then keeping said match value of said aggregation variable only as long as said accumulation variable has said match value after said comparison of the respective service consumer data set with the respective service instance data set.

6. The method according to one of the claim 3, wherein said aggregating further comprises assigning a partial match value to said compare variable, if only said state value of said respective state of said service consumer data set has said wildcard value.

7. The method according to claim 6, wherein said aggregating further comprises assigning said partial match value to said accumulation variable, if, while going down said state hierarchy the compare variable has said match value, or said partial match value and said accumulation variable has said match value or said partial match value.

8. The method according to claim 7, wherein said aggregating further comprises assigning said partial match value to said aggregation variable, if, while aggregating said results of said comparison of each respective service consumer data set with each respective service instance data set,
said aggregation variable has said fail value and said accumulation variable has said match value or said partial-match value, and otherwise assigning to said aggregation variable said fail value.

9. The method according to claim 1, wherein said states comprise locations or time intervals.

10. An apparatus for a context-based service lookup, the apparatus comprising:
a service instance, having a scope, comprising at least one service instance data set having a hierarchical state structure, with each state of each hierarchy level being contained in a respective higher level state of hierarchy,
wherein the apparatus is adapted to receive from a service consumer, having a situation, at least one service consumer data set having said hierarchical state structure, and wherein said service instance data set comprises an amount of hierarchy levels which are independent from an amount of hierarchy levels contained in said service consumer data set,
wherein the apparatus is further designed to perform comparisons of each service consumer data set with each service instance data set by comparing respective state values of states of a same hierarchy level, and aggregate the results of the comparisons,
wherein the apparatus determines, depending on the aggregate results, whether said situation of said service consumer matches said scope of said service instance, and output an aggregate variable after said determine whether said situation of said service consumer matches said scope of said service instance, said aggregate variable comprising a fail value, and
wherein the apparatus assigns a match value to a compare variable, if said respective state values of states of the same level in the hierarchy of said service consumer data set and a state value of said service instance data set have a wild card value, said wild card value comprising a value that stands for all possible values of said respective state values of states.

11. The apparatus according to claim 10, wherein said comparing of the respective state values of states of the same hierarchy level comprises starting with the highest level in hierarchy and then going down the hierarchy until the lowest level in hierarchy state of either of said service consumer data set or said service instance data set has been compared.

12. The apparatus according to claim 10, wherein the apparatus is adapted to assign the match value to the compare variable, if said respective states values of states of the same hierarchy of said service consumer data set and said service instance data set match each other.

13. The apparatus according to claim 12, wherein the apparatus is adapted to accumulate said comparison results by first initializing an accumulation variable with said match value, second keeping said match value for the accumulation variable only as long as while going down the state hierarchy, said compare variable has said match value.

14. The apparatus according to claim 13, wherein the apparatus is adapted to aggregate the results of the comparison of each respective service consumer data set with each respective service instance data set by first initializing an aggregation variable with said match value, and then keeping said match value of said aggregation variable only as long as said accumulation variable has said match value after said comparison of the respective service consumer data set with the respective service instance data set.

15. The apparatus according to claim 12, wherein the apparatus is adapted to assign a partial match value to said compare variable, if only said state value of said respective state of said service consumer data set has said wildcard value.

16. The apparatus according to claim 15, wherein the apparatus is adapted to assign said partial match value to said accumulation variable if, while going down said state hierarchy, the compare variable has said match value or said partial match value, and said accumulation variable has said match value or said partial match value.

17. The apparatus according to claim 16, wherein the apparatus is adapted to assign said partial match value to said aggregation variable if, while aggregating said results of said full comparison of each respective service consumer data set with each respective service instance data set:
said aggregation variable has said match value and said accumulation value has said partial match value or said fail value;
said aggregation variable has said partial match value; or
said aggregation variable has said fail value and said accumulation variable has said match value, or said partial match value, and otherwise assigning to said aggregation variable said fail value.

18. The apparatus according to claim 10, wherein said states comprise locations or time intervals.

19. A method of equipping a client system with a context-based service lookup, said method comprising:
providing a system capable of:
comparing each service consumer data set of a service consumer with each service instance data set of a service instance within a processor by comparing respective state values of states of a same level of hierarchy of said service consumer data set or said service instance data set, starting with a highest level in the hierarchy and then going down a hierarchy;
aggregating the results of the comparisons of each respective service consumer data set with each respective service instance data set within the processor;
determining, depending on the aggregate results, whether a situation of said service consumer matches a scope of said service instance within the processor;
after said determining whether said situation of said service consumer matches said scope of said service instance, outputting an aggregate variable that comprises a fail value; and
assigning a match value to a compare variable, if out of said respective state values of states of the same level in the hierarchy of said service consumer data set and a state value of said service instance data set, only the state value of said service instance data set has a wild card value.

20. The method according to claim 7, wherein said aggregating further comprises assigning said partial match value to said aggregation variable, if, while aggregating said results of said comparison of each respective service consumer data set with each respective service instance data set, said aggregation variable has said match value and said accumulation value has said partial match value.

21. The method according to claim 7, wherein said aggregating further comprises assigning said partial match value to said aggregation variable, if, while aggregating said results of said comparison of each respective service consumer data set with each respective service instance data set, said aggregation variable has the fail value.

* * * * *